US009898444B1

(12) United States Patent
Rybakov et al.

(10) Patent No.: US 9,898,444 B1
(45) Date of Patent: *Feb. 20, 2018

(54) IMAGE COMPARISON FOR USER INTERFACE TESTING

(71) Applicant: Amazon Technologies, Inc., Seattle, WA (US)

(72) Inventors: Oleg Rybakov, Seattle, WA (US); Andre Young Moeller, Seattle, WA (US); Ram Prasad Venkatesan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/074,263

(22) Filed: Mar. 18, 2016

(51) Int. Cl.
*G06K 9/34* (2006.01)
*G06F 17/22* (2006.01)
*H04L 29/08* (2006.01)
*G06T 7/40* (2017.01)
*G06T 7/00* (2017.01)
*G06K 9/62* (2006.01)
*G06T 7/60* (2017.01)

(52) U.S. Cl.
CPC ...... *G06F 17/2211* (2013.01); *G06F 17/2247* (2013.01); *G06F 17/2288* (2013.01); *G06K 9/344* (2013.01); *G06K 9/6202* (2013.01); *G06K 9/6276* (2013.01); *G06T 7/003* (2013.01); *G06T 7/0026* (2013.01); *G06T 7/0044* (2013.01); *G06T 7/0081* (2013.01); *G06T 7/408* (2013.01); *G06T 7/60* (2013.01); *H04L 67/02* (2013.01); *G06T 2207/30176* (2013.01)

(58) Field of Classification Search
CPC .. G06K 9/6407; G06K 9/2009; G06K 9/6423; G06T 7/001; G06F 17/30249
See application file for complete search history.

(56) References Cited

U.S. PATENT DOCUMENTS

| 8,332,284 | B1* | 12/2012 | Runo | G06Q 30/0603 705/27.2 |
| 8,375,305 | B1* | 2/2013 | Strand | G06Q 30/02 715/234 |
| 9,171,195 | B1* | 10/2015 | Rybakov | G06K 9/00201 |
| 2015/0200861 | A1* | 7/2015 | Lee | H04L 67/02 709/203 |
| 2015/0293897 | A1* | 10/2015 | Myslinski | G06Q 10/06 707/755 |

OTHER PUBLICATIONS http://www.imagemagick.org/script/compare.php.
(Continued)

*Primary Examiner* — Amir Alavi
(74) *Attorney, Agent, or Firm* — Thomas Horstemeyer, LLP (57) ABSTRACT

Disclosed are various embodiments for comparing images of network pages using computer vision to identify changes that have occurred between two versions of a network page. A first plurality of segments in a first image representing a first version of a network page are identified and a second plurality of segments in a second image representing a second version of the network page are identified. It is then determined whether each segment in the first plurality of segments matches a respective segment in the second plurality of segments or vice versa.

18 Claims, 4 Drawing Sheets

(56) References Cited

OTHER PUBLICATIONS

Pratt "Introduction to Digital Image Processing", CRC Press, 2013.
Lowe "Object recognition from local scale-invariant features", Proceedings of the International Conference on Computer Vision, 1999.
Bradski et al. "Learning OpenCV. Computer Vision with the OpenCV Library", 2008.
Khan "Image Segmentation Techniques: A Survey", Journal of Image and Graphics, 1:4, Dec. 2013.
OpenCV, http://opencv.org/.

* cited by examiner

IMAGE COMPARISON FOR USER INTERFACE TESTING

BACKGROUND

Network pages include a variety of elements. These elements can include functional elements, such as embedded scripts, as well as data elements, such as links to audio or video content or stylesheets that determine the layout of the elements of the network page. Updates to the elements may be required at times in order to improve the functionality of the network page, such as by optimizing a script or updating the links to audio or video content to refer a new server hosting the linked content. However, these changes can sometimes result in unintended alterations to the "look and feel" of a network page by changing how the network page is rendered by a client application, such as a browser.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using computer vision techniques to detect changes in network pages. Network pages can incorporate a number of data elements (e.g., links to images, videos, or audio) and logical or functional elements (e.g., embedded client side scripts or server side scripts to be executed prior to sending the network page to a client). Changes to these data elements or logical elements can result in unintended changes to the presentation of a network page. For example, changes to a database function call to retrieve content for a network page can result in additional content being included in the network page. Alternatively, a change to a database function call can result in content previously included in the network page being omitted. In some instances, these changes can also result in the content of the network page being arranged in a different manner. Further, network pages are often designed to be rendered on multiple devices with different screen sizes (e.g., laptop, tablet, smartphone, etc.) and therefore have elements that can dynamically size themselves to for different screen sizes. Further, some elements will load different content on subsequent page loads (e.g., advertisements, lists of recently viewed items or pages, etc.). As a result, even if the layout of a network page does not change, the content in two different versions of a network page may change as a result of the operation of the dynamic elements. Previous approaches to automating detection of changes to network pages may not detect these changes minor changes to the layout, or may falsely indicate that the layout has changed due to a dynamic element loading different content on subsequent page loads as intended. For example, approaches that analyze the document object model (DOM) tree of a network page may not detect changes to the appearance of a network page when it is rendered by different browser engines or on different screens. Likewise, a pixel-by-pixel comparison of two images of two different versions of a network page may generate false positives where the different versions have the same layout, but have different content. The use of computer vision techniques to compare two images of two versions of a network page can address these problems. In the following discussion, a general description of the system and its components is provided, followed by a discussion of the operation of the same.

Figure 1:
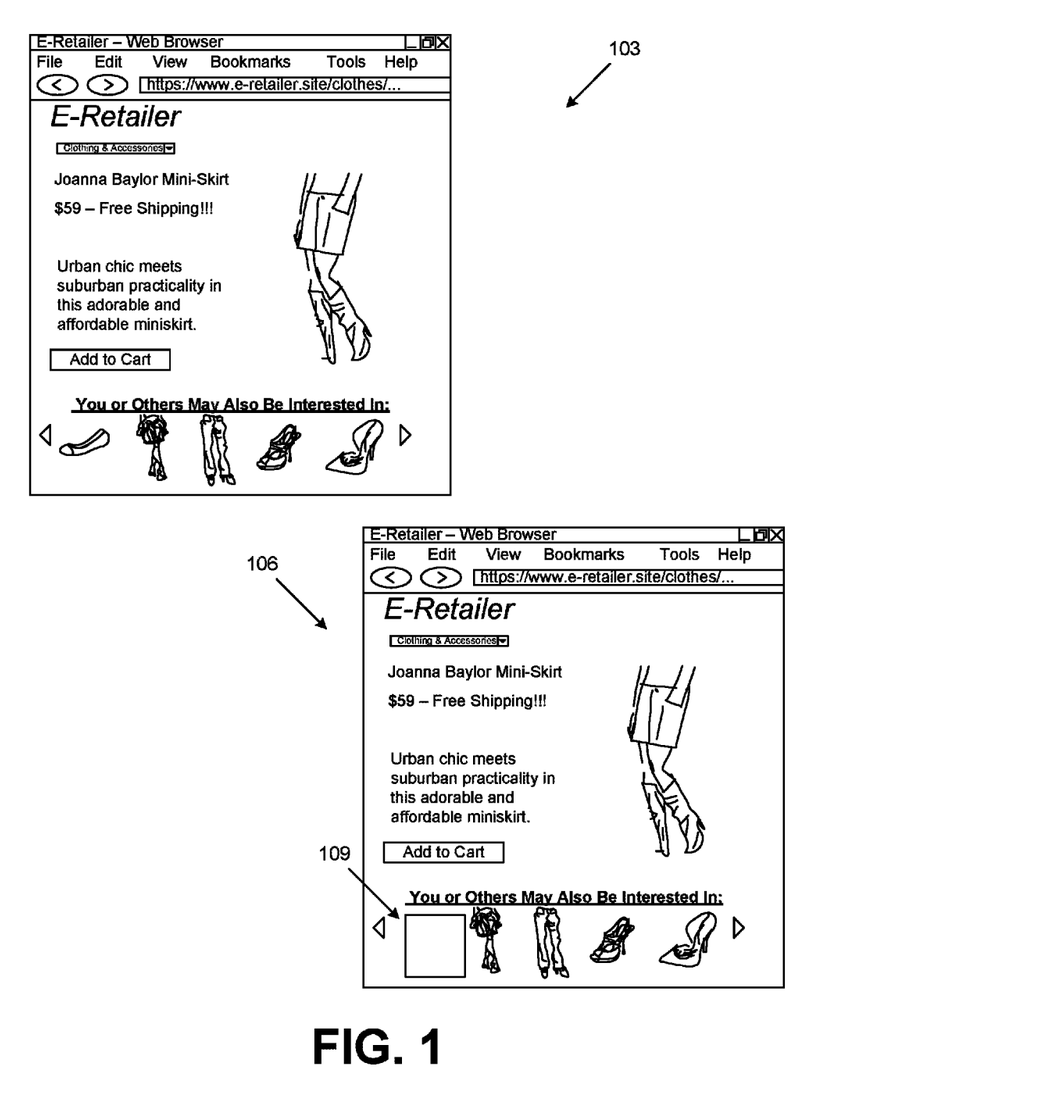
FIG. 1 is a pictorial diagram of an example of the operation of various embodiments of the present disclosure.

FIG. 1 depicts an example of the operation of various embodiments of the present disclosure. Image 103 represents a first image of a first version of network page. Image 106 represents a second image of a second version of the network page. The first image 103 was created prior to a change to the network page being made, while the second image 106 was created after the change to the network page was applied. As illustrated, an error indicator 109 has been added to the second image 106 of the second version of the network page. The error indicator 109 in this example appears in the form of a box placed around an element missing from the second image 106 of the second version of the network page that was present in the first image 103 of the first version of the network page. However, other error indicators can be used. The missing element of the network page was identified by comparing the first image 103 to the second image 106 using various computer vision techniques, as further described in this application.

Figure 2:
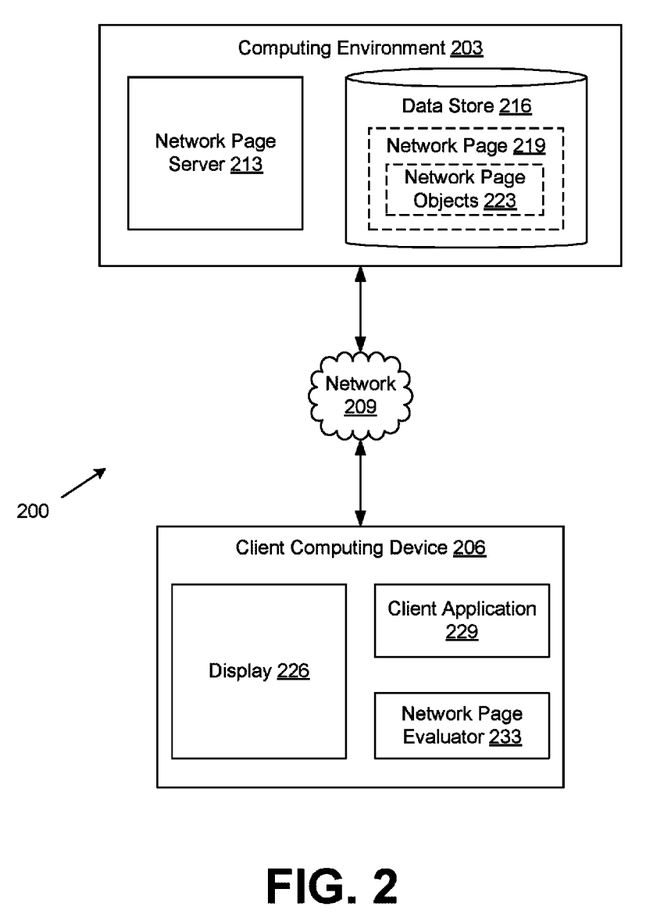
FIG. 2 is a drawing of a networked environment according to various embodiments of the present disclosure.

With reference to FIG. 2 shown is a networked environment 200 according to various embodiments. The networked environment 200 includes a computing environment 203 and a client computing device 206, which are in data communication with each other via a network 209. The network 209 includes, for example, the Internet, intranets, extranets, wide area networks (WANs), local area networks (LANs), wired networks, wireless networks, or any combination of two or more such networks. For example, such networks can include satellite networks, cable networks, Ethernet networks, and other types of networks.

The computing environment 203 can include a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together can include a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. The components executed on the computing environment 203, for example, include the network page server 213 and other applications, services, processes, systems, engines, or functionality not discussed in detail herein.

Also, various data is stored in a data store 216 that is accessible to the computing environment 203. The data store 216 may be representative of a plurality of data stores 216 as can be appreciated. The data stored in the data store 216, for example, is associated with the operation of the network page server 213, and other applications. Accordingly, the data stored in the data store 216 includes, for example, network pages 219, and potentially other data.

The network page server 213 can be executed to provide a network page 219 to a client device 206 in response to a request from a browser or similar application. In some instances, the network page server 213 can further be executed to process application logic embedded in a network page 219. For example, a network page 219 may include one or more embedded scripts intended to be executed by the network page server 213 when generating a network page 219. This could include, for example, a script executing a function call to the data store 216 to retrieve content to be included in the network page 219 or other functions.

Network pages 219 can include a document suitable for rendering by a browser application. The network page 219 can be encoded in one or more markup languages that define the content of the network page 219 and the layout of the content within the network page 219, such as a version of the hypertext markup language (HTML), a version of the extensible markup language (XML), or a similar markup language. The content of the network page 219 can include one or more network page objects 223.

Network page objects 223 can include one or more components of a network page 219. For example, a network page object 223 can include an image file, a video file, and audio file, text content, scripts (e.g., embedded JavaScript providing programmatic functions), links to other network page objects 223 or network pages 219, and potentially other content. In some instances, a network page object 223 can be embedded in or included in a network page 219. In other instances, a network page object 223 can be linked to the network page 219 (e.g., via a "hyperlink" or similar referrer).

The client computing device 206 is representative of a plurality of client computing devices that may be coupled to the network 209. The client computing device 206 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client computing device 206 may include a display 226. The display 226 can include, for example, one or more devices such as liquid crystal displays (LCDs), gas plasma-based flat panel displays, organic light emitting diode (OLED) displays, electrophoretic ink (E-ink) displays, projectors, or other types of display devices.

The client computing device 206 can be configured to execute various applications such as a client application 229 or other applications. The client application 229 may be executed by the client computing device 206, for example, to access network pages 223 served up by the network page server 213, thereby rendering a user interface on the display 226. To this end, the client application 229 can include, for example, a browser, a dedicated application, etc., and the user interface can include a network page 223, an application screen, etc. The client computing device 206 may be configured to execute applications beyond the client application 229, such as the network page evaluator 233. The client computing device 206 can also be configured to execute other applications, such as email applications, social networking applications, word processors, spreadsheets, and/or other applications.

The network page evaluator 233 can be executed to identify changes between two different versions of a network page 219 by comparing an image of a first version of a network page 219 rendered by the client application 229 to an image of a second version of the network page 219 rendered by the client application 229. For example, changes to the information in the data store 216 or changes to the way network page objects 223 are accessed from the data store 216 could result in changes to content displayed on the network page 219. Likewise, changes to the application logic of scripts embedded in a network page 219 could result in a network page 219 rendering a different set of network page objects 223 or rendering the network page objects 223 in a different arrangement. As another example, different versions of the client application 229 could render the same network page 219 in a different manner (e.g., placing network page objects 223 in different locations). To obtain the image of the first version of the network page 219 and the image of the second version of the network page 219, the network page evaluator 233 may use a screen capture or similar mechanism to capture an image of the network page 219 as rendered on the display of the client computing device 206.

Next, a general description of the operation of the various components of the networked environment 200 is provided. To begin, one or more changes are made to the network page 219 that could potentially alter or change the way the network page 219 is presented or rendered by the client application 229. For example, a developer may change the underlying HTML or XML file to alter the file paths of links to various network page objects 223. In an electronic commerce example, the application logic powering a search bar included in the network page 219 could have been changed. In order to make sure that changes to the network page 219 do not affect the appearance of the network page when rendered by the client application 229, an image of a first version of the network page 219 from before the change was made and an image of a second version of the network page 219 from after the change was made are submitted to the network page evaluator 233. In some cases, submission of the two images to the network page evaluator 233 can be automated to occur whenever any change is made to the network page 219. These cases might include scenarios where the network page evaluator 233 is a component of an integrated development environment (IDE) or an automated test suite. However, the images can, in some embodiments, be manually provided to the network page evaluator 233.

The network page evaluator 233 then uses various computer vision techniques to determine whether the image of the first version of the network page 219 differs from the second version of the network page 219. For example, the network page evaluator 233 may use various computer vision approaches to determine whether a network page object 223 in the image second version of the network page 219 has changed size, shape, color, or position with respect to the image of the first version of the network page 219. Similar techniques can be used to determine whether a network page object 223 in the first version of the network page 219 is missing from the second version of the network page 219 or vice versa. By using these computer vision techniques instead of analyzing the underlying HTML or XML files of the two versions of the network page 219, differences in the appearance of the network page 219 resulting from how the network page 219 is rendered by the client application 229 can be detected.

The network page evaluator 233 then reports whether the image of the first version of the network page 219 differs from the image of the second version of the network page 219. If the two images differ, then the network page evaluator 233 can cause an error message to be rendered on the display 226 of the client computing device 206. In some instances, the error message can include an identification of the network page object 223 in the image of the second version of the network page 219 that fails to match a respective network page object 223 in the image of the first version of the network page 219. This provides a developer an opportunity to fix the error, if any, that caused the image of the second version of the network page 219 to differ from the image of the first version of the network page 219.

Figure 3:
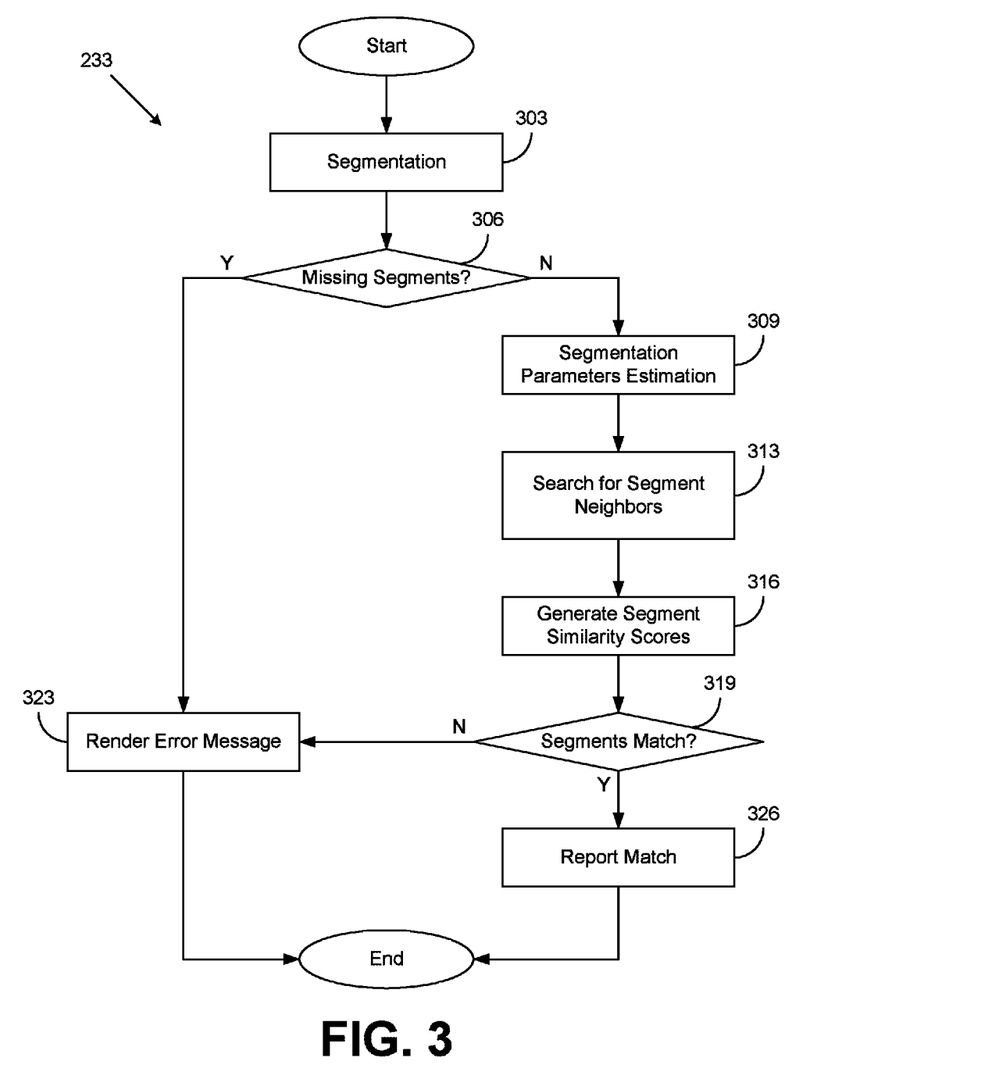
FIG. 3 is a flowchart illustrating one example of functionality implemented as portions of an application executed in a computing environment in the networked environment of FIG. 1 according to various embodiments of the present disclosure.

Referring next to FIG. 3, shown is a flowchart that provides one example of the operation of a portion of the network page evaluator 233 according to various embodiments. It is understood that the flowchart of FIG. 3 provides merely an example of the many different types of functional arrangements that may be employed to implement the operation of the portion of the network page evaluator 233 as described herein. As an alternative, the flowchart of FIG. 3 may be viewed as depicting an example of elements of a method implemented in the client computing device 206 (FIG. 2) according to one or more embodiments. However, in some instances, the network page evaluator 233 can be implemented in the computing environment 200 (FIG. 2).

To begin, the network page evaluator 233 is provided with two different images respective to two different versions of a network page 219 (FIG. 2). The images can originate from several different sources. In some instances, a user can capture screenshots of the client application 229 (FIG. 2) and submit these screenshots to the network page evaluator 233. In other instances, the network page evaluator 233 can capture an image of the network page 219 rendered by the client application 229. In various instances, the client application 229 can be configured to provide rendered copies of the different versions of the network page 219 to the network page evaluator 233.

At box 303, the network page evaluator 233 segments the image for the first version of the network page 219 and segments the image for the second version of the network page 219. The segmentation process identifies distinct features or elements in each image. Segmentation can be accomplished using various computer vision techniques.

For example, a thresholding technique can be used to identify segments in each image. Using this technique, a threshold value is chosen for the intensity or brightness of the image. Each pixel with an intensity or brightness less than the threshold is replaced with a black pixel, while each pixel with an intensity greater than the threshold is replaced with a white pixel. In some instances, the image may first be converted to a grayscale image to simplify the process prior to assigning a color value to individual pixels. However, other colors can be used for the same effect (e.g., red and blue or two different shades of green instead of white and black). Individual segments in the image, which can correspond to various network page objects 223, can then be identified as groups or clusters of black pixels.

Moving on to box 306, the network page evaluator 233 determines whether any segments present in one version of the image of the network page 219 are missing from the other version of the image of the network page 219. If no segments are determined to be missing, then execution proceeds to box 309. However, if one or more segments are determined to be missing, then execution instead skips to box 323. In some embodiments, however, the branch can be optional. In these instances, the process will continue to box 309 after the network page evaluator 233 identifies any missing segments. These embodiments may be used when a maximum amount of information regarding the similarity between two versions of an image of a network page is desired.

The network page evaluator 233 can use one or more techniques to determine whether any segments present in one version of the image of the network page 219 are missing from the other version of the image of the network page 219. In one technique, the network page evaluator 233 can count the number of segments present in each version of the image of the network page 219. If the number of segments present in one version of the image of the network page 219 fails to match the number of segments present in the other version of the network page 219, then the network page evaluator 233 could determine that one or more segments present in one version of the network page 219 are missing from the other version of the network page 219. By determining whether segments in one version of the image of the network page 219 are missing from another version of the image of the network page 219, the network page evaluator 233 can avoid further processing in identifying features missing from one version of the network page 219.

Proceeding to box 309, the network page evaluator 233 estimates one or more parameters for each of the segments in each version of the image of the network page 219. For example, the network page evaluator 233 can surround each identified segment with a rectangular box and calculate the area within the box to estimate the size of the segment. Likewise, the network page evaluator 233 can estimate the width and length of each segment by determining the width and length of the rectangular box enclosing the segment. In some approaches, computer vision techniques can be used to identify the shape of each of the segments.

Referring next to box 313, the network page evaluator 233 performs a neighbor search for each segment in the first version of the image of the network page 219 to identify segments in the second version of the image of the network page 219 that are similar to the segment in the first version of the image. In some instances, the network page evaluator 233 can also perform a neighbor search for each segment in the second version of the image of the network page 219 to identify segments in the first version of the image of the network page 219 that are similar to the segment in the image of the second version. Segments can be classified as similar based on size or shape (e.g., similar length or width), location (e.g., are two segments in approximately the same location in the two images of the two versions of the network page 219), and other factors. Each segment in the second version of the image of the network page 219 that is identified using the neighbor search is added to a list of neighbors for a respective segment from the first version of the image of the network page 219 and vice versa.

Moving on to box 316, the network page evaluator 233 generates a similarity score representing the similarity between a segment in the first version of the image of the network page 219 and one of the neighbor segments from the second version of the image of the network previously in the list of neighbors previously identified at box 313. The similarity score represents how similar two segments appear when rendered by the client application 229. The similarity score can allow the network page evaluator 233 to determine whether a network page object 223 of a network page 219 has changed significantly (e.g., as a result of a change to the underlying network page 219) between one version of a network page 219 to another version of the network page 219. This can allow for changes in the layout of a network page 219 to be detected. Such changes can occur, for example, when changes are made to various scripts, logic, or other code used to generate the network page 219. The similarity score can be calculated using various approaches.

For example, the network page evaluator 233 can calculate the difference between the average brightness of two respective segments of the two images. This can be accomplished by calculating an average difference in brightness, as indicated on a scale ranging from 0-255, of respective individual pixels in the two respective segments. The difference in the average brightness of each pair of pixels is then summed. The sum of the difference in the average brightness of each pair of pixels is subsequently divided by the total number of pixels to generate the difference in the average brightness between the two respective segments. A value of 0 for the different in the average brightness would indicate that there is no difference in the brightness between the two respective segments.

Using a threshold value accommodates for rendering differences of the network page 219 caused when the first version of the network page 219 is rendered by a first browser and the second version of the network page is rendered by a second browser. In such instances, minor differences between the rendering engines of different browsers can result in slightly different color values for individual network objects 223 of a rendered network page 219. By setting a threshold value for the average brightness between two respective segments of two different images of two different versions of a network page 219, these minor rendering differences between different browsers can be accommodated.

As another example, the network page evaluator 233 can perform optical character recognition (OCR) on two segments. If the two segments contain the same text, then the two segments may be marked as similar. If used in combination with the average brightness approached discussed above, then the similarity score may be adjusted based on whether the two segments contain the same text.

Proceeding to box 319, the network page evaluator 233 determines whether a segment in the first image of the first version of the network page 219 matches a respective segment in the second image of the second version of the network page 219. If the network page evaluator 233 determines that the two respective segments fail to match, execution of the process proceeds to box 323. However, if the network page evaluator 233 determines that the two respective segments do match, execution of the process proceeds to box 326. The network page evaluator 233 can determine whether the two respective segments match based on a number of factors. In some embodiments, only a single factor may be considered, while in other embodiments, multiple factors may be considered together.

First, the network page evaluator 233 can determine whether the estimated parameters of the segment from the first version of the image of the network page 219 match the estimated parameters of the respective segment from the second version of the image of the network page 219. For example, if the area, length, or width of the two segments fail to match, then the network page evaluator 233 can determine that the two respective segments do not match each other. This could occur, for example, when a network page object 223 rendered in a first version of the network page 219 has changed its size or shape in the second version of the network page 219.

Second, the network page evaluator 233 can determine whether the similarity score for the two respective segments that was previously generated at box 316 is below a threshold value. If the similarity score is below a threshold value, then the network page evaluator 233 can determine that the two segments match. If the similarity score is above the threshold value, then the network page evaluator 233 can determine that the two segments fail to match.

Third, the network page evaluator 233 can, in some instances, determine whether the shape of a first segment from the first version of the image of the network page 219 matches the shape of a segment from the second version of the image of the network page 219. For example, if the shape of the first segment were a rectangle, and the shape of the second segment were a circle, the network page evaluator 233 could determine that the two segments did not match. Likewise, if the shape of the first and second segment were the same, this could indicate a match.

Referring next to box 323, the network page evaluator 233 causes an error message to be rendered on the display 226 of the client computing device 206. The error message can include, for example, a message indicating that the second version of the network page 219 is rendered differently from the first version of the network page 219. In some instances, the change in the second version of the network page 219 can be highlighted. For example, a box may be drawn around one or more network page objects 223 that have changed in size, shape, position, color, or that are newly added to the second version of the network page 219 or were omitted from the second version of the network page 219. In various instances, the error message can also include additional information for evaluation, such as the number of missing segments, the similarity scores between individual pairs of segments, the threshold value used for calculating the similarity score, and potentially other information. This additional information can be used, for example, to identify false positives or false negatives as well as other purposes.

However, if execution instead proceeds from box 319 to box 326, the network page evaluator 233 can report a match. In general this can include an indication that the first version of the network page 219 appears the same as the second version of the network page 219 when rendered by the client application 229. However, in some instances, only an error message may be rendered and failure to render an error message can be used as an indication that the two versions of the network page 219 appear similar or the same when rendered by the client application 229. In addition, a notification can be displayed that includes additional data for evaluation, such as the number of missing segments, the similarity scores between individual pairs of segments, the threshold value used for calculating the similarity score, and potentially other information. This additional information can be used, for example, to identify false positives or false negatives as well as other purposes.

Figure 4:
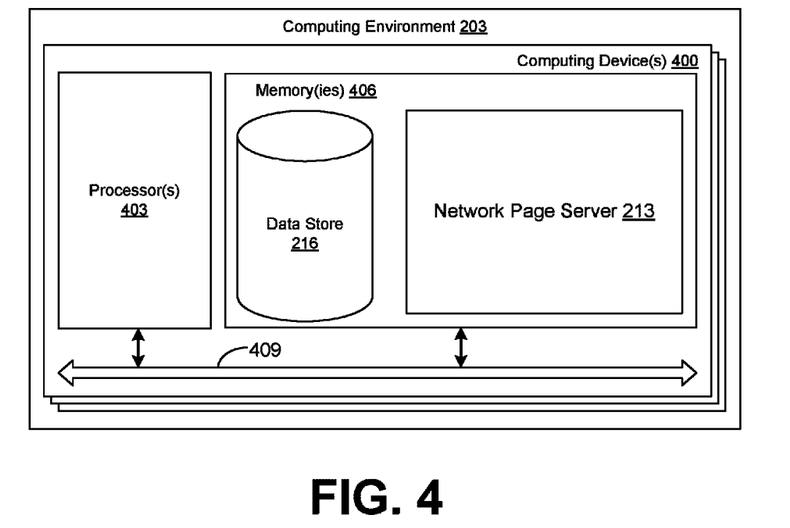
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 can include, for example, at least one server computer or like device. The local interface 409 can include, for example, a data bus with an accompanying address/control bus or other bus structure as can be appreciated.

Stored in the memory 406 are both data and several components that are executable by the processor 403. In particular, stored in the memory 406 and executable by the processor 403 are the network page server 213, and potentially other applications. Also stored in the memory 406 may be a data store 216 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 can include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can include, for example, static random access memory (SRAM), dynamic random access memory (DRAM), or magnetic random access memory (MRAM) and other such devices. The ROM can include, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 can include additional systems designed to coordinate this communication, including, for example, performing load balancing. The processor 403 may be of electrical or of some other available construction.

Although the network page server 213, the client application 229, and the network page evaluator 233, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the network page evaluator 233. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system of the computing environment or a processor of the client computing device 203 (FIG. 2). The machine code may be converted from the source code. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 213, the client application 229, and the network page evaluator 233, that includes software or code can be embodied in any non-transitory computer-readable medium for use by or in connection with an instruction execution system such as, for example, a processor 403 in a computer system or a processor of a client computing device. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network page server 213, the client application 229, and the network page evaluator 233, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   an application stored in the memory of the computing device and comprising machine readable instructions that, when executed by the processor, cause the computing device to at least:
   identify a first plurality of segments in a first image representing a first version of a network page;
   identify a second plurality of segments in a second image representing a second version of the network page;
   determine that the content of each segment in the first plurality of segments matches the content of a respective segment in the second plurality of segments, wherein a determination that the content of each segment in the first plurality of segments matches the content of the respective segment in the second plurality of segments is based at least in part on a subset of the machine readable instructions that, when executed by the processor, cause the computing device to at least:
   calculate a difference between each pixel of a segment in the first plurality of segments and each respective pixel of a respective segment in the second plurality of segments;
   sum the difference for each pixel; and
   compare the difference to a threshold value; and
   cause a message to be rendered on a display of the computing device, wherein the message indicates that the content of the first image matches the content of the second image based at least in part on a determination that each segment in the first plurality of segments matches the respective segment in the second plurality of segments.

2. The system of claim 1, wherein the application further comprises machine readable instructions that, in order to cause the computing device to determine that the content of each segment in the first plurality of segments matches the content of the respective segment in the second plurality of segments, further causes the computing device to at least:
   compare a total quantity of the first plurality of segments to a total quantity of the second plurality of segments; and
   determine the total quantity of the first plurality of segments matching the total quantity of the second plurality of segments.

3. The system of claim 1, wherein the application further comprises machine readable instructions that, in order to cause the computing device to determine that the content of each segment in the first plurality of segments matches the content of the respective segment in the second plurality of segments, further causes the computing device to at least:
   compare a height and width of one of the first plurality of segments to a respective height and width of a respective one of the second plurality of segments; and
   determine that the height and width of one of the first plurality of segments is substantially equivalent to the respective height and width of the respective one of the second plurality of segments.

4. The system of claim 1, wherein the application further comprises machine readable instructions that, in order to cause the computing device to determine that the content of each segment in the first plurality of segments matches the content of the respective segment in the second plurality of segments, further causes the computing device to at least:
   determine a location of a neighbor segment relative to one of the first plurality of segments;
   determine a respective location of a respective neighbor segment relative to a respective one of the second plurality of segments; and
   determine that the location of the neighbor segment relative to the one of the first plurality of segments is substantially similar to the respective location of the respective neighbor segment relative to the respective one of the second plurality of segments.

5. The system of claim 1, wherein the application further comprises machine readable instructions that, in order to cause the computing device to determine that the content of each segment in the first plurality of segments matches the content of the respective segment in the second plurality of segments, further causes the computing device to at least perform a nearest neighbor search.

6. The system of claim 1, wherein the application further comprises machine readable instructions that, in order to cause the computing device to determine that the content of each segment in the first plurality of segments matches the content of the respective segment in the second plurality of segments, further causes the computing device to at least:
- determine a shape of a neighbor segment relative to one of the first plurality of segments;
- determine a respective shape of a respective neighbor segment relative to a respective one of the second plurality of segments; and
- determine that the shape of the neighbor segment relative to the one of the first plurality of segments is substantially similar to the respective shape of the respective neighbor segment relative to the respective one of the second plurality of segments.

7. A system, comprising:
- a computing device comprising a processor and a memory; and
- an application stored in the memory of the computing device and comprising machine readable instructions that, when executed by the processor, cause the computing device to at least:
  - identify a first plurality of segments in a first image representing a first version of a network page;
  - identify a second plurality of segments in a second image representing a second version of the network page;
  - determine that the content of each segment in the first plurality of segments matches the content of a respective segment in the second plurality of segments, wherein a determination that the content of each segment in the first plurality of segments matches the content of the respective segment in the second plurality of segments is based at least in part on a subset of the machine readable instructions that, when executed by the processor, cause the computing device to at least:
    - calculate a difference for a brightness value for each pixel of a segment in the first plurality of segments and a respective brightness value for each respective pixel of the respective segment in the second plurality of segments;
    - average the difference for the brightness value; and
    - compare the difference for the brightness value to a threshold value; and
  - cause a message to be rendered on a display of the computing device, wherein the message indicates that the content of the first image matches the content of the second image based at least in part on a determination that each segment in the first plurality of segments matches the respective segment in the second plurality of segments.

8. The system of claim 7, wherein the application further comprises machine readable instructions that, in order to cause the computing device to determine that the content of each segment in the first plurality of segments matches the content of the respective segment in the second plurality of segments, further causes the computing device to at least:
- compare a total quantity of the first plurality of segments to a total quantity of the second plurality of segments; and
- determine the total quantity of the first plurality of segments matching the total quantity of the second plurality of segments.

9. The system of claim 7, wherein the application further comprises machine readable instructions that, in order to cause the computing device to determine that the content of each segment in the first plurality of segments matches the content of the respective segment in the second plurality of segments, further causes the computing device to at least:
- compare a height and width of one of the first plurality of segments to a respective height and width of a respective one of the second plurality of segments; and
- determine that the height and width of one of the first plurality of segments is substantially equivalent to the respective height and width of the respective one of the second plurality of segments.

10. The system of claim 7, wherein the application further comprises machine readable instructions that, in order to cause the computing device to determine that the content of each segment in the first plurality of segments matches the content of the respective segment in the second plurality of segments, further causes the computing device to at least:
- determine a location of a neighbor segment relative to one of the first plurality of segments;
- determine a respective location of a respective neighbor segment relative to a respective one of the second plurality of segments; and
- determine that the location of the neighbor segment relative to the one of the first plurality of segments is substantially similar to the respective location of the respective neighbor segment relative to the respective one of the second plurality of segments.

11. The system of claim 7, wherein the application further comprises machine readable instructions that, in order to cause the computing device to determine that the content of each segment in the first plurality of segments matches the content of the respective segment in the second plurality of segments, further causes the computing device to at least perform a nearest neighbor search.

12. The system of claim 7, wherein the application further comprises machine readable instructions that, in order to cause the computing device to determine that the content of each segment in the first plurality of segments matches the content of the respective segment in the second plurality of segments, further causes the computing device to at least:
- determine a shape of a neighbor segment relative to one of the first plurality of segments;
- determine a respective shape of a respective neighbor segment relative to a respective one of the second plurality of segments; and
- determine that the shape of the neighbor segment relative to the one of the first plurality of segments is substantially similar to the respective shape of the respective neighbor segment relative to the respective one of the second plurality of segments.

13. A system, comprising:
- a computing device comprising a processor and a memory; and
- an application stored in the memory of the computing device and comprising machine readable instructions that, when executed by the processor, cause the computing device to at least:
  - identify a first plurality of segments in a first image representing a first version of a network page;
  - identify a second plurality of segments in a second image representing a second version of the network page;
  - determine that the content of each segment in the first plurality of segments matches the content of a respective segment in the second plurality of segments, wherein a determination that the content of each segment in the first plurality of segments matches the content of the respective segment in the second plurality of segments is based at least in part on a subset of the machine readable instructions that, when executed by the processor, cause the computing device to at least:

perform optical character recognition on a segment in the first plurality of segments to identify a first text string;

perform optical character recognition on the respective segment in the second plurality of segments to identify a second text string; and determine that the first text string matches the second text string; and cause a message to be rendered on a display of the computing device, wherein the message indicates that the content of the first image matches the content of the second image based at least in part on a determination that each segment in the first plurality of segments matches the respective segment in the second plurality of segments.

14. The system of claim 13, wherein the application further comprises machine readable instructions that, in order to cause the computing device to determine that the content of each segment in the first plurality of segments matches the content of the respective segment in the second plurality of segments, further causes the computing device to at least:

compare a total quantity of the first plurality of segments to a total quantity of the second plurality of segments; and determine the total quantity of the first plurality of segments matching the total quantity of the second plurality of segments.

15. The system of claim 13, wherein the application further comprises machine readable instructions that, in order to cause the computing device to determine that the content of each segment in the first plurality of segments matches the content of the respective segment in the second plurality of segments, further causes the computing device to at least:

compare a height and width of one of the first plurality of segments to a respective height and width of a respective one of the second plurality of segments; and determine that the height and width of one of the first plurality of segments is substantially equivalent to the respective height and width of the respective one of the second plurality of segments.

16. The system of claim 13, wherein the application further comprises machine readable instructions that, in order to cause the computing device to determine that the content of each segment in the first plurality of segments matches the content of the respective segment in the second plurality of segments, further causes the computing device to at least:

determine a location of a neighbor segment relative to one of the first plurality of segments;

determine a respective location of a respective neighbor segment relative to a respective one of the second plurality of segments; and determine that the location of the neighbor segment relative to the one of the first plurality of segments is substantially similar to the respective location of the respective neighbor segment relative to the respective one of the second plurality of segments.

17. The system of claim 13, wherein the application further comprises machine readable instructions that, in order to cause the computing device to determine that the content of each segment in the first plurality of segments matches the content of the respective segment in the second plurality of segments, further causes the computing device to at least perform a nearest neighbor search.

18. The system of claim 13, wherein the application further comprises machine readable instructions that, in order to cause the computing device to determine that the content of each segment in the first plurality of segments matches the content of the respective segment in the second plurality of segments, further causes the computing device to at least:

determine a shape of a neighbor segment relative to one of the first plurality of segments;

determine a respective shape of a respective neighbor segment relative to a respective one of the second plurality of segments; and determine that the shape of the neighbor segment relative to the one of the first plurality of segments is substantially similar to the respective shape of the respective neighbor segment relative to the respective one of the second plurality of segments.

* * * * *